United States Patent
Barcelo et al.

(10) Patent No.: US 10,983,061 B2
(45) Date of Patent: Apr. 20, 2021

(54) SURFACE ENHANCED LUMINESCENCE NANO PILLAR STAGE

(71) Applicant: HEWLETT-PACKARD DEVELOPMENT COMPANY, L.P., Spring, TX (US)

(72) Inventors: Steven Barcelo, Palo Alto, CA (US); Anita Rogacs, San Diego, CA (US); Raghuvir N. Sengupta, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,429

(22) PCT Filed: Oct. 24, 2017

(86) PCT No.: PCT/US2017/058037
§ 371 (c)(1),
(2) Date: Oct. 18, 2019

(87) PCT Pub. No.: WO2019/083507
PCT Pub. Date: May 2, 2019

(65) Prior Publication Data
US 2020/0256800 A1    Aug. 13, 2020

(51) Int. Cl.
*B82Y 15/00* (2011.01)
*G01N 21/65* (2006.01)

(52) U.S. Cl.
CPC ............ *G01N 21/658* (2013.01); *B82Y 15/00* (2013.01)

(58) Field of Classification Search
CPC .. G01N 21/658; B82Y 15/00; B01L 3/502715
See application file for complete search history.

(56) References Cited

U.S. PATENT DOCUMENTS

| 8,333,934 | B2 | 12/2012 | Cao et al. |
| 9,658,184 | B2 | 5/2017 | Luan et al. |
| 2009/0142504 | A1* | 6/2009 | Ervin ............... H01M 50/60 427/430.1 |
| 2012/0164745 | A1 | 6/2012 | Fu et al. |
| 2013/0062204 | A1 | 3/2013 | Ziegler |
| 2014/0009758 | A1 | 1/2014 | Li et al. |

(Continued)

FOREIGN PATENT DOCUMENTS

| WO | WO-2017082933 | 5/2017 |
| WO | WO2017151098 A1 | 9/2017 |

OTHER PUBLICATIONS

Chen, G. et al., "Integration of Large-area Polymer Nanopillar Arrays Into Microfluidic Devices Using in Situ Polymerization Cast Molding", Lab Chip, Oct. 8, 2007, 4 Pages, https://www.ncbi.nlm.nih.gov/pubmed/17960266.

(Continued)

*Primary Examiner* — Maurice C Smith
(74) *Attorney, Agent, or Firm* — Rathe Lindenbaum LLP

(57) ABSTRACT

A surface enhanced luminescence analyte nano pillar stage may include a substrate, an array of closable pillars extending from the substrate and a fluid supply connected to the array of pillars. The fluid supply is to at least partially replenish fluid amongst the pillars of the array that has evaporated to maintain a level of the fluid amongst the pillars of the array below tops of the pillars.

15 Claims, 5 Drawing Sheets

(56) References Cited

U.S. PATENT DOCUMENTS

| | | | |
|---|---|---|---|
| 2014/0256028 A1 | 9/2014 | Kobayashi et al. | |
| 2015/0116706 A1* | 4/2015 | Barcelo | B82Y 15/00 356/301 |
| 2015/0362486 A1 | 12/2015 | Li et al. | |
| 2019/0025218 A1* | 1/2019 | Barcelo | G01N 21/658 |
| 2019/0154587 A1* | 5/2019 | Ge | G01N 21/658 |

OTHER PUBLICATIONS

Grinthal, Grinthal, et al. "Steering nanofibers: An integrative approach to bio-inspired fiber fabrication and assembly." Nano Today 7, No. 1 (2012): 35-52.

* cited by examiner

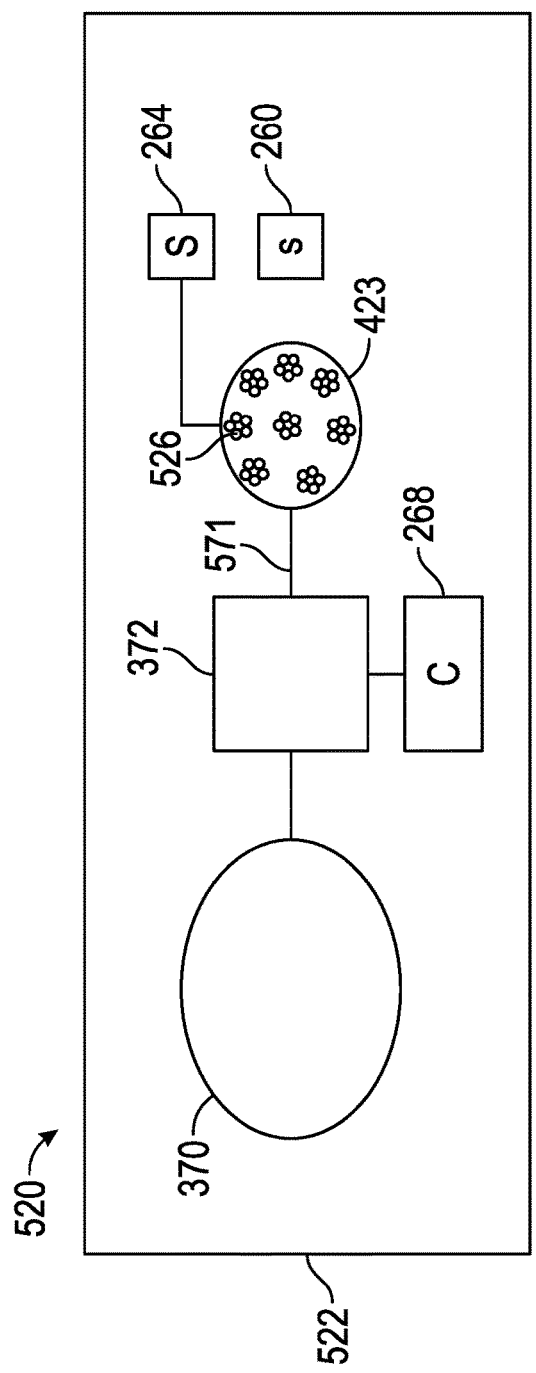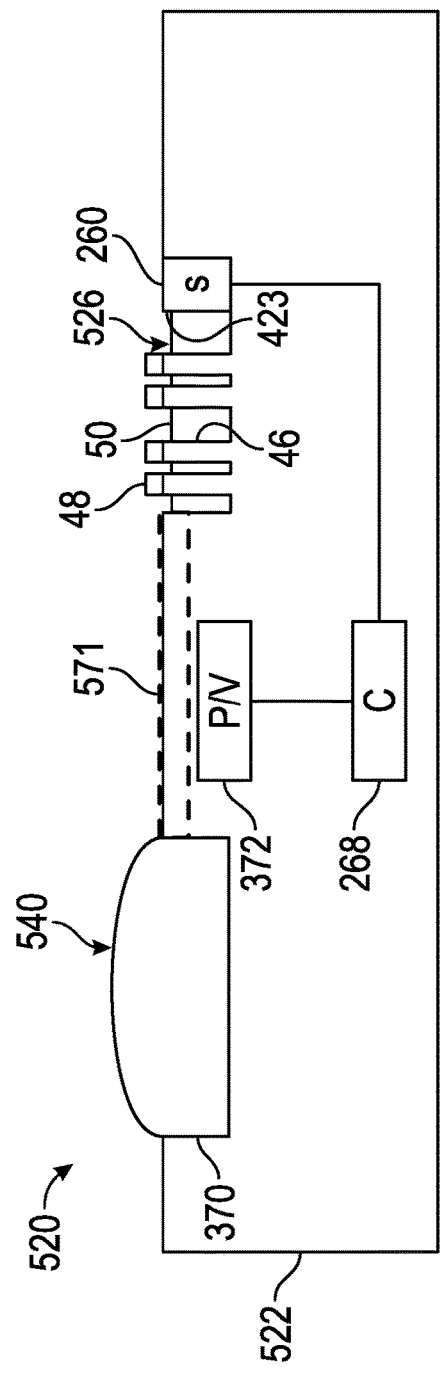

SURFACE ENHANCED LUMINESCENCE NANO PILLAR STAGE

BACKGROUND

Nano pillars are sometimes used in surface enhanced luminescence procedures. With such procedures, the nano pillars are closed or bent towards one another to form plasmonic "hotspots". In many applications, capillary forces are utilized to close the nano pillars.

BRIEF DESCRIPTION OF THE DRAWINGS

FIG. 10 is a top view schematically illustrating portions of an example SEL nano pillar stage.

FIG. 11 is a sectional view of the example SEL nano pillar stage of FIG. 10.

Figure 1:
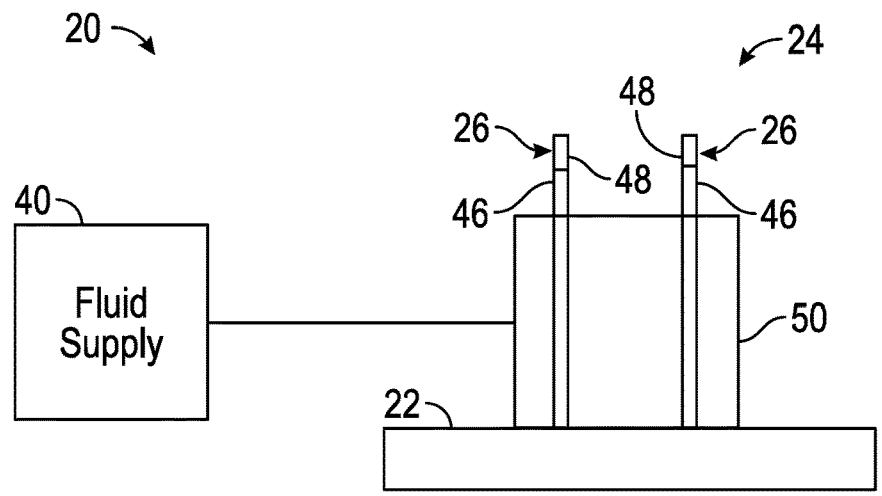
FIG. 1 is a schematic diagram illustrating portions of an example SEL nano pillar stage.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Surface enhanced luminescence (SEL) involves the detection and measurement of responses of an analyte to a stimulus. Examples of such SEL techniques include surface enhanced Ramen spectroscopy (SERS) and fluorescence detection. The responses to such stimulus are enhanced by sensing the analyte while the analyte resides upon a plasmonic surface. In many applications, the plasmonic surfaces are provided by nano pillars having plasmonic caps, wherein the nano pillars bend or close towards one another and into close proximity with one another such that the plasmonic caps form "hotspots" that enhance the SEL response to the stimulus, increasing its detectability and measurement.

Disclosed herein are example SEL nano pillar stages that facilitate more uniform and more reliable closure of the nano pillars to provide more consistent hotspots and more consistent and reliable results. It has been discovered that evaporation of fluid utilized to facilitate capillary closure of the nano pillars may occur so rapidly that regions of the nano pillars do not reliably close to form hotspots. It has further been discovered that repeated wetting and drying of the nano pillars may produce more reliable closure of the nano pillars. The disclosed nano pillar stages and methods replenish liquid that has evaporated to reduce the likelihood that the liquid will completely evaporate before capillary forces have closed the nano pillars. The replenishment of the liquid that has evaporated may further provide repeated drying steps for more uniform nano pillar closure.

Disclosed herein is an example SEL nano pillar stage that may comprise a substrate, an array of closable pillars extending from the substrate and a fluid supply connected to the array of pillars. The fluid supply is to at least partially replenish fluid amongst the pillars of the array that has evaporated to maintain a level of the fluid amongst the pillars of the array below tops of the pillars.

Disclosed herein is an example method that may comprise: (1) evaporating fluid amongst an array of closable pillars of a surface enhanced luminescence nano pillar stage; and (2) at least partially replenishing the fluid amongst the pillars of the array that has evaporated to maintain a level of the fluid amongst the pillars of the array below tops of the pillars.

Disclosed herein is an example SEL nano pillar stage that may comprise a substrate, a basin formed in the substrate, an array of closable pillars extending from the substrate within the basin and a fluid reservoir. The fluid reservoir is connected to the basin to contain a fluid to at least partially replenish fluid amongst the pillars of the array that has evaporated to maintain a level of the fluid amongst the pillars of the array below the tops of the pillars.

FIG. 1 is a schematic diagram of portions of an example SEL nano pillar stage 20. Stage 20 facilitates more uniform and more reliable closure of the nano pillars to provide more consistent hotspots and more consistent and reliable results. Stage 20 replenishes liquid that has evaporated to reduce the likelihood that the liquid will completely evaporate before capillary forces have closed the nano pillars. The replenishment of the liquid that has evaporated may further provide repeated drying steps for more uniform nano pillar closure. As shown by FIG. 1, stage 20 comprises substrate 22, an array 24 of nano pillars 26 (two which are shown) and fluid supply 40.

Substrate 22 comprises a base or platform for supporting nano pillars 26. In one implementation, substrate 22 may be formed from the same material as that of portions of nano pillars 26. In other implementations, substrate 22 maybe form from a different material than that of nano pillars 26. Examples of materials from which substrate 22 may be formed include, but are not limited to, photo resists, polymers, glass, ceramics and silicon.

Nano pillars 26, sometimes referred to as nano fingers, comprise columnar structures projecting from substrate 24. Each of pillars 26 comprises a polymeric post 46 and a metallic cap 48 on and supported by the polymeric post 46.

In one implementation, such posts 46 have an aspect ratio of and at least 10:1 (a height of at least 10 times the thickness or diameter). In one implementation, such posts have a thickness or diameter between 50 nm and 150 nm, while, at the same time, having a height of at least 500 nm and, in one implementation, at least 700 nm. In some implementations, the posts 46 are movable and are self-actuating, wherein such columnar structures bend or flex towards one another in response to micro-capillary forces so as to self-organize, wherein such bending facilitates close spacing between the structures for greater scattered radiation intensity.

The polymer material from which posts 46 are formed facilitates the use of molding, imprinting or other fabrication techniques to form posts 46. The polymer material further facilitates bending and flexing of posts 46 and subsequent closing during use of package 20. Examples of polymer materials from which each post 46 may be formed include, but are not limited to, photo resists, hard mold resins such as PMMA, soft mold polymers such as PDMS, ETFE or PTFE, hybrid-mold cross-linked uv-curable or thermal-curable polymers based on acrylate, methacrylate, vinyl, epoxy, siloxane, peroxide, urethane or isocyanate. The polymer materials may be modified to improve imprint and mechanical properties with copolymers, additives, fillers, modifiers, photoinitiators and the like.

Metallic caps 48 comprise metallic structures formed on top of posts 36. Each metallic cap 48 comprises a metal material that forms a plasmonic surface that enhances the intensity of electromagnetic radiation emitted as a result of the reaction of the analyte and the light impinging the analyte upon pillars 26. In one implementation, each metallic cap 48 comprises silver, gold, copper, platinum, aluminum, or combinations of these metals in the form of alloys or multilayer systems. In another implementation, each metallic cap 48 may comprise other metallic materials that provide such intensity enhancement.

Figure 2:
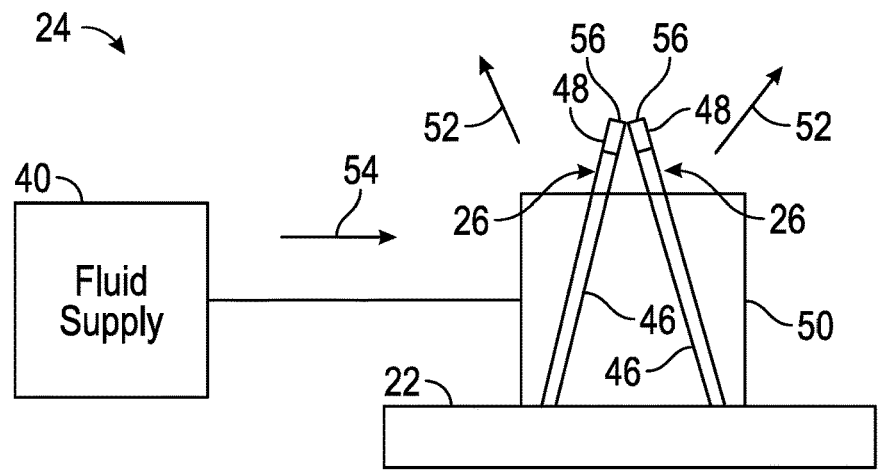
FIG. 2 is a schematic diagram illustrating portions of the example SEL nano pillar stage of FIG. 1 during closure of example nano pillars of the stage.

Fluid supply 40 replenishes fluid 50 that may have evaporated during closure of nano pillars 26. As shown by FIG. 2, as fluid 50 is evaporating (as indicated by arrow 52), fluid supply 40 supplies replenishing fluid (as indicated by arrow 54). Fluid supply 40 replenishes the fluid to maintain a level of the fluid amongst the nano pillars 26 below the tops 56 of nano pillars 26, and in one implementation, below caps 48 of nano pillars 26. In one implementation, fluid supply 40 replenishes the fluid at a rate corresponding to the rate of evaporation such that the level of the fluid amongst the nano pillars 26 is constant for a predefined period of time.

In another implementation, fluid supply 40 replenishes the fluid at a rate less than that of the rate of evaporation such the level fluid amongst the nano pillars 26 may be falling or moving closer to substrate 22, but wherein the period of time during which nano pillars 26 may close under capillary forces with the presence of fluid 50 is increased as compared to no replenishment taking place. In still other implementations, fluid supply 40 may replenish fluid at a varying rate such that the level of fluid 50 repeatedly rises and falls (while still being below tops the six (or below caps 48), subjecting nano pillars 26 to repeated wetting and drying steps or cycles to provide enhanced closure of nano pillars 26.

In one implementation, fluid 50 is retained amongst nano pillars 26 by capillary forces between the closely arranged nano pillars 26. In another implementation, fluid 50 is retained amongst the nano pillars 26 by being contained within a basin in which nano pillars 26 are located. The floor and sidewalls of the basin contain a fluid 50 about and amongst nano pillars 26.

In one implementation, fluid supply 40 supplies replenishing fluid to the array 24 of nano pillars 26 at a constant predetermined rate which may be empirically determined based upon the rate of evaporation, the closure characteristics of nano pillars 26 and the target degree of closure of the various nano pillars 26 of array 24. In another implementation, fluid supply 40 supplies replenishing fluid to the array 24 of nano pillars 26 at a declining predetermined uniform rate or at a declining predetermined nonuniform rate depending upon an expected rate of evaporation of fluid 50 as well as the bending or closing characteristics of nano pillars 26.

In one implementation, fluid supply 40 may dynamically supply replenishing fluid based upon different sensed characteristics. For example, in one implementation, fluid supply 40 may supply replenishing fluid based upon a sensed degree of closure of nano pillars 26. In another implementation, fluid supply 40 may supply replenishing fluid based upon a sensed level of fluid 50 amongst the nano pillars 26. In some implementations, fluid supply 40 may supply replenishing fluid based upon multiple factors such as both the sensed degree of closure of nano pillars 26 as well as the sensed level of fluid 50 amongst nano pillars 26. By prolonging the period of time during which capillary forces may close nano pillars 26 and/or by exposing nano pillars 26 to multiple wetting and drying cycles, closure of nano pillars 26 may be more reliable and consistent.

In one implementation, nano pillars 26 are initially fully submersed within the liquid 50 which contains an analyte, facilitating deposition of the analyte on caps 48. After sufficient deposition of the analyte on caps 48, the level of fluid 50 is permitted to fall to below tops 56, or, in one implementation, below caps 48, to facilitate capillary closure of nano pillars 26. Once the level fluid 50 has a sufficiently dropped to facilitate closure, fluid supply 40 may initiate the replenishment of fluid to prolong the period of time during which nano pillars 26 may close under capillary forces.

In yet other implementations, the analyte may be deposited upon nano pillars 26 independent of fluid 50. For example, nano pillars 26 may be submersed within a first fluid containing an analyte, wherein the first fluid is withdrawn and fluid 50, a second fluid, is subsequently supplied to nano pillars 26, but having a level that is below tops 56 or below caps 48. The fluid 50 is then replenished by fluid supply 40 for a sufficient period of time to facilitate consistent and reliable closure of nano pillars 26. In such an implementation, the first fluid may be a fluid that is more accommodating to or more suitable for the particular analyte, whereas the second fluid, fluid 50, maybe a fluid that is less suitable for the particular analyte, but that better facilitates closure of nano pillars 26. For example, the first fluid may be water containing an analyte while the second fluid may comprise another fluid such as ethanol, methanol, hexane or acetonitrile. In still other implementations, analyte 50 may be deposited upon caps 48 in other fashions independent of fluid 50.

In one implementation, the rate at which fluid supply 40 replenishes fluid to nano pillars 26 is controlled in a passive fashion in that stage 20 does not rely upon any valves, pumps or the like or any controllers. In such an implementation, the rate at which fluid is replenished is controlled based upon dimensionally defined capillary forces and fluid pressures. For example, the rate at which fluid is replenished may be controlled based upon the dimensioning of various structures of stage 20, wherein the rate of replenishment is controlled by the level of fluid in a reservoir of fluid supply 40, the pressure of the fluid provided by fluid supply 40, the spacing and corresponding capillary retention forces of nano pillars 26, the size and length of the microfluidic passage connecting fluid supply 40 to the region containing nano pillars 26 and/or the height of a basin (when utilized) relative to the height of nano pillars 26.

In other implementations, the rate at which fluid supply 40 replenishes fluid nano pillars 26 may be actively controlled, using a controller which outputs control signals to control at least one of a pump and valve. In some implementations, the controller may output such control signals based upon signals received from at least one sensor. For example, the controller may output control signals based upon signals received from a fluid level sensor or a closure sensor (described below).

Figure 3:
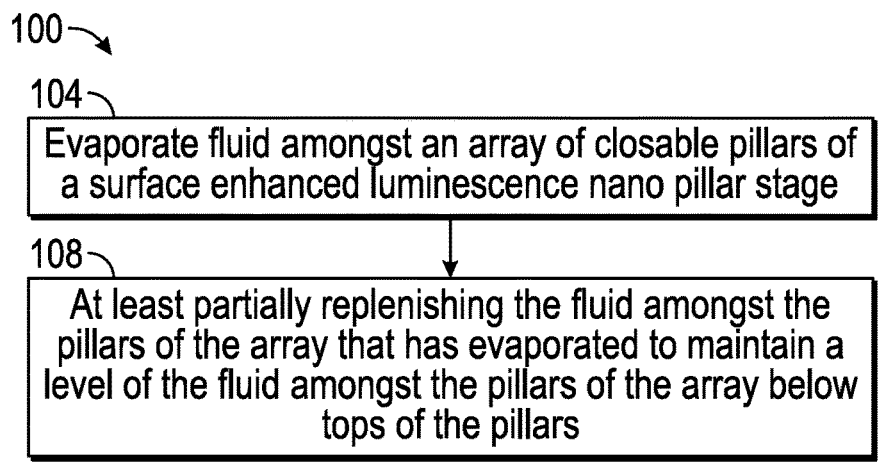
FIG. 3 is a flow diagram of an example method for closing nano pillars of an example SEL nano pillar stage.

FIG. 3 is a flow diagram of an example method 100 for closing nano pillars of an SEL stage. Method 100 facilitates more uniform and more reliable closure of the nano pillars to provide more consistent hotspots and more consistent and reliable results. Method 100 replenishes liquid that has evaporated to reduce the likelihood that the liquid will completely evaporate before capillary forces have closed the nano pillars. The replenishment of the liquid that has evaporated may further provide repeated drying steps for more uniform nano pillar closure. Although method 100 is described in the context of being carried out by stage 20 described above, it should be appreciative that method 100 may be carried out with any of the example stages described hereafter or with other similar SEL stages.

As indicated by block 104, fluid 50 is evaporated amongst an array 24 of closable pillars 26 of a SEL nano pillar stage. In some implementations, such evaporation may be facilitated through the application of heat to the fluid 50. For example, in some implementations, substrate 22 may comprise thermal resistors, wherein the application of electrical current cause such resistance output heat that increases the rate of evaporation of fluid 50.

As indicated by block 108, the fluid that has evaporated amongst the nano pillars 26 of the array 24 is at least partially replenished to maintain a level of the fluid 50 amongst the pillars of the array below tops 56 of the pillars 26. For purposes of this disclosure, a "level" of fluid means the presence of at least some fluid such that the level is nonzero, rising above the bottom of substrate 22 or the bottom of nano pillars 26. Maintaining a "level" of the fluid below a certain point means that the top surface of the fluid is located above the lower terminal ends of the nano fingers 26 and the certain point, between the floor of a substrate from which the nano finger 26 extend and the certain point. In some implementations, the fluid 50 is replenished such that the level of the fluid is maintained below caps 48.

Figure 4:
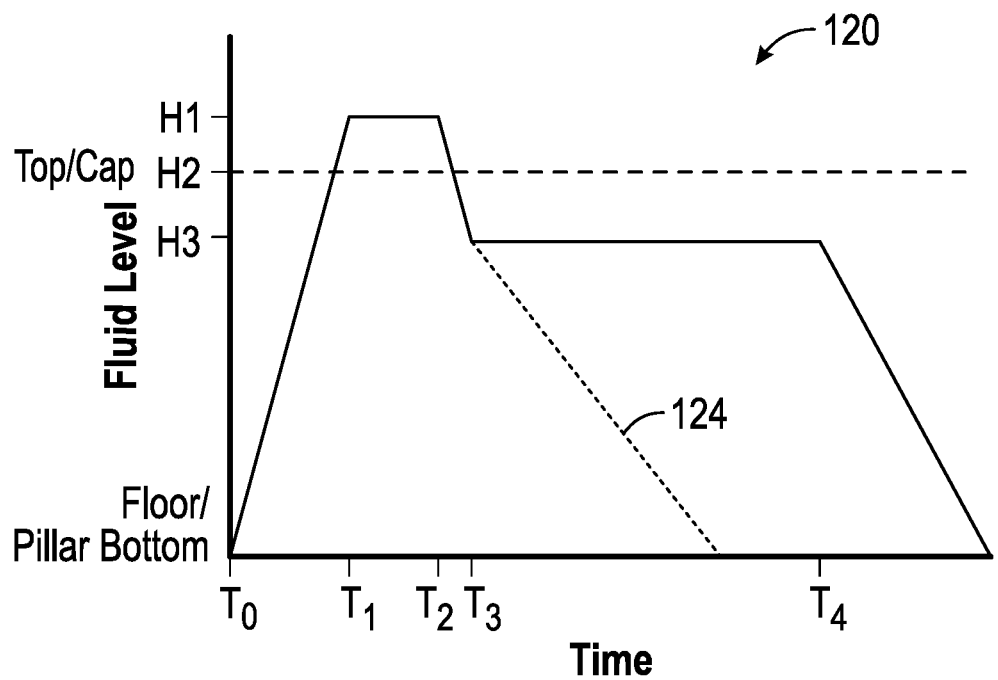
FIG. 4 is a graph illustrating an example fluid replenishment protocol.
Figure 5:
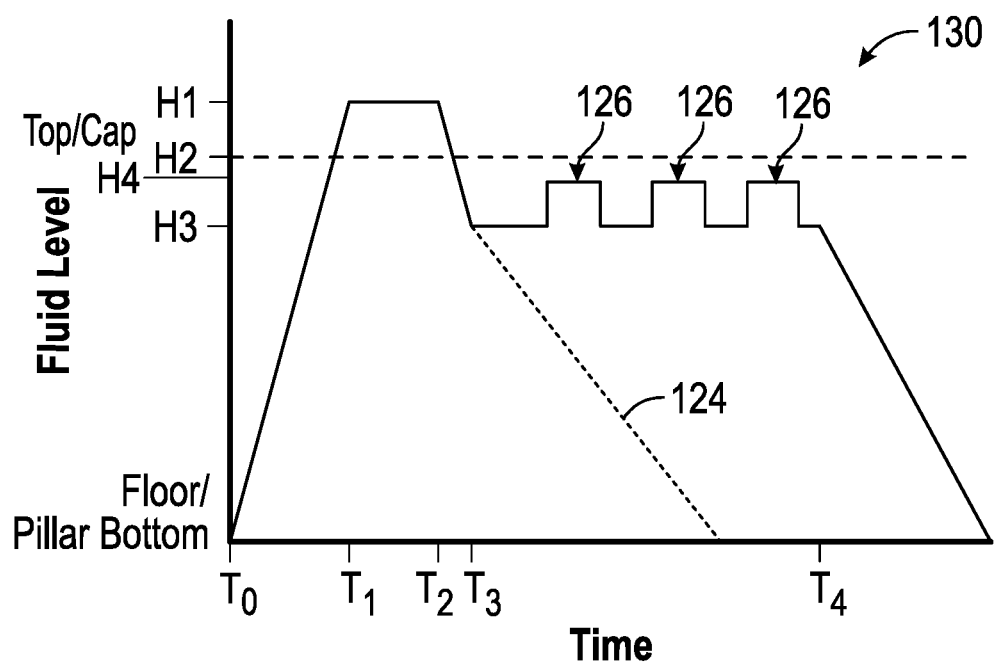
FIG. 5 is a graph illustrating an example replenishment protocol.
Figure 6:
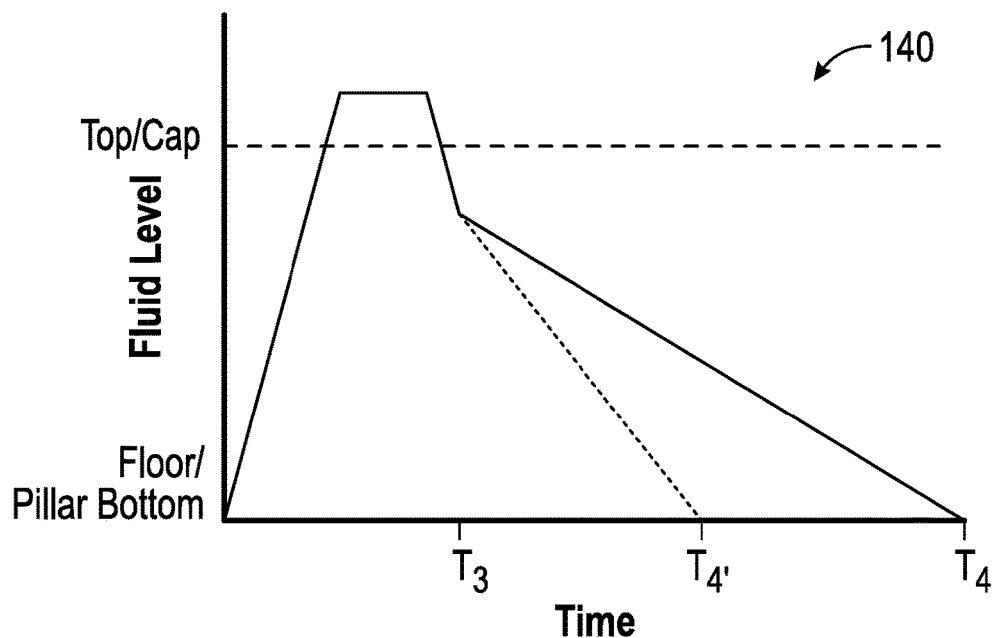
FIG. 6 is a graph illustrating an example replenishment protocol.

FIGS. 4-6 illustrate different example fluid replenishment protocols, illustrating how the level of fluid amongst the array 24 pillars 26 may be controlled or adjusted over time while maintaining the level below tops of the nano pillars. FIG. 4 illustrates an example protocol 120 for system 20 or pursuant to method 100, in which the level of fluid 50 is replenished at a rate that substantially corresponds to the rate of evaporation while the nano pillars are being closed under the influence of capillary forces. As shown by FIG. 4, the level of fluid 50 is initially increased during time T0-T1 to a height H1 above the height H2 of the tops 56 or caps 48 of nano pillars 26. The level fluid is maintained at height H1 for a sufficient period of time (to time T2) to facilitate adsorption of the analyte on the caps 48. At such time T2, the level fluid is dropped to a height H3 below height H2. The fluid level may be dropped through evaporation and/or by being drained away.

Once the level is at height H3, at time T3, fluid supply 40 begins replenishing fluid at a rate that substantially corresponds to the rate of evaporation such that the level of fluid 50 is maintained at a constant predetermined height H3 until time T4, wherein the lapse of time between times T3 and T4 is sufficient for uniform consisting closure of nano pillars 26. At time T4, fluid 50, about nano pillars 26 is evaporated away or withdrawn. The broken line 124 indicates one example of the level of fluid 50 over time in the absence of fluid replenishment by fluid supply 40.

FIG. 5 illustrates an example protocol 130 for system 20 or pursuant to method 100, in which the level of fluid 50 is repeatedly risen and lowered to provide repeated wetting and drying cycles for nano pillar closure. As shown by FIG. 5, the level of fluid 50 is initially increased during time T0-T1 to a height H1 above the height H2 of the tops 56 or caps 48 of nano pillars 26. The level fluid is maintained at height H1 for a sufficient period of time (to time T2) to facilitate adsorption of the analyte on the caps 48. At such time T2, the level fluid is dropped to a height H3 below height H2.

Once the level is at height H3, fluid supply 40 begins replenishing fluid at a nonuniform rate such that the level of fluid 50 repeatedly rises and falls between time T3 and time T4. In the example illustrated, the level of fluid 50 fluctuates between heights H3 and H4, both of which are still below height H2. Although FIG. 5 illustrates three example wetting and drying cycles, 126, it should be appreciated that protocol 130 may include a greater or fewer of such cycles 126.

FIG. 6 illustrates an example protocol 140 for system 20 or pursuant to method 100, in which the level of fluid 50 is maintained below height H2 and in which fluid 50 is replenished but at a rate less than that of evaporation. As shown by FIG. 5, the level of fluid 50 is initially increased during time T0-T1 to a height H1 above the height H2 of the tops 56 or caps 48 of nano pillars 26. The level fluid is maintained at height H1 for a sufficient period of time (to time T2) to facilitate adsorption of the analyte on the caps 48. At such time T2, the level fluid is dropped to a height H3 below height H2.

Once the level is at height H3, fluid supply 40 begins replenishing fluid loss through evaporation. However, such replenishment is at a rate less than the rate of evaporation such that the level fluid amongst nano pillars 26 gradually lowers between times T3 and T4. As shown by FIG. 6, the replenishing of fluid by fluid supply 50 delays the time at which the fluid level reaches the bottom of nano pillars 26 (time T4 vs. time T4'). The prolonged exposure of nano pillars 26 to fluid 50 provides more reliable and uniform closure of nano pillars 26.

In each of the example protocols shown in FIGS. 4-6, the level of fluid is initially increased to a point above the tops 56 and above the caps 48 such that analyte carried by the fluid may become deposited upon caps 48. It should be appreciated that where the analyte is deposited upon caps 48 of pillars 26 in other fashions, the portion of such protocols from time T0 to T3, initially increasing the level of fluid above tops 56 or above caps 48, may be omitted.

Figure 7:
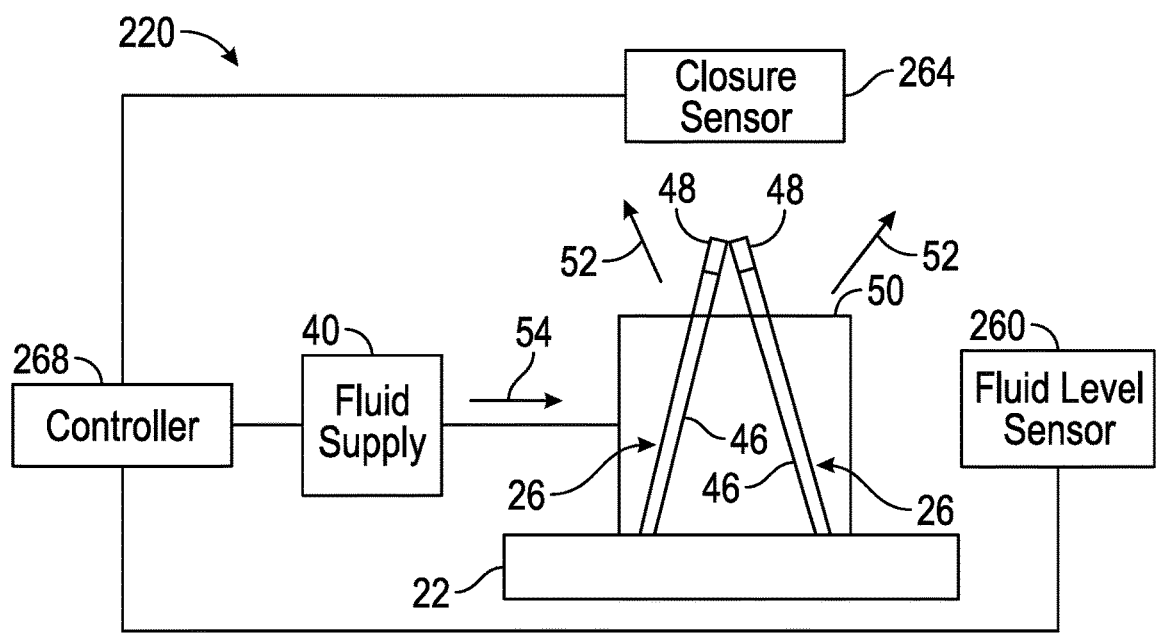
FIG. 7 is a schematic diagram illustrating portions of an example SEL nano pillar stage.

FIG. 7 schematically illustrates portions of example SEL nano pillar stage 220. Stage 220 is similar to stage 20 described above except that stage 220 is specifically illustrated as further comprising fluid level sensor 260, closure sensor 264 and controller 268. Those remaining components of stage 220 which correspond to components of stage 20 are numbered similarly.

Fluid level sensor 260 comprises a component that outputs signals indicating a sensed level of fluid about or amongst nano pillars 26. For example, in one implementation, fluid level sensor 260 may comprise a conductive level sensor. In another implementation, fluid level sensor 260 may comprise a capacitance level sensor or other forms of a fluid level sensor.

Closure sensor 264 comprises a component that output signals indicating a sensed degree of closure of nano fingers 26. In one implementation, closure sensor 264 may comprise an optical sensor. In yet other implementations, closure sensor 26 may comprise other forms of a sensor.

Controller 268 comprises a processing unit that follows instructions contained in a non-transitory computer-readable medium or logic formed as part of an integrated circuit that outputs control signals controlling the replenishment of fluid by fluid supply 40. In the example illustrated, controller 268 outputs control signals based upon signals received from fluid level sensor 260 and closure sensor 264. Such control signals may control a valve and/or pump or other fluid delivery mechanism of fluid supply 40 to control when fluid is replenished or the rate at which fluid is replenished. For example, during replenishment by fluid supply 40 or while fluid supply 40 is supplying a fluid to nano pillars 26, the fluid may be rising and its height may reach a predetermined level. In response to the height reaching the predetermined level, as indicated by sensor 260, controller 268 may output control signals causing supply 42 cease replenishing fluid or causing supply 40 to slow the rate at which fluid is supplied.

Controller 268 may receive signals from fluid level sensor 260 indicating that the level of fluid has fallen to below a predetermined height. In response to the height fallen below the predetermined level, controller 268 may output control signals causing supply 40 to begin replenishing fluid or to increase the rate at which fluid is being supplied. In some implementations, fluid level sensor 260 may sense the rate at which the fluid is evaporated, wherein signals from sensor 260 indicating the rate of evaporation are used by controller 2682 select a rate at which fluid supply 40 is to replenish fluid to nano pillars 26. In some implementations, fluid level sensor 260 may be omitted.

In the example illustrated, controller 268 may output control signals additionally based upon signals from closure sensor 264. For example, controller 268 may remain within a replenishment mode until signals from closure sensor 264 indicate that nano pillars 26 have sufficiently closed. While in the replenishment mode, controller 268 may continue to output control signals to fluid supply 40 causing fluid supply 40 to replenish fluid 50 about nano pillars 26, as appropriate, based upon signals from fluid level sensor 260 (as discussed above). Upon receiving signals from closure sensor 264 indicating nano pillars 26 have sufficiently closed (bent such that the caps 48 are in sufficient proximity to one another), controller 268 may exit the replenishment mode and may output control signals causing fluid 50 to be drained or otherwise withdrawn from about nano pillars 26 readying stage 220 for interrogation with an applied stimulus, wherein the response to the stimulus is measured and detected for analyzing the analyte residing on caps 48.

In some implementations, controller 268 may vary the rate at which fluid is replenished based upon signals from closure sensor 264. For example, upon the distance spacing caps 48 satisfying a predetermined threshold, as sensed by closure sensor 264, controller 268 may adjust the rate at which fluid supply 40 replenishes fluid to nano pillars 26. In yet another implementation, controller 268 may control the rate at which fluid supply 40 replenishes fluid based upon a combination of both the level of fluid and the degree of closure of nano pillars 26 to enhance the rate at which nano pillars 26 close or to enhance the degree of closure. For example, upon receiving signals from sensor 264 that nano pillars 26 have closed to a first degree (a first spacing distance), controller 268 may output control signals to fluid supply 40 such that fluid is maintained at a first level or height below tops 56 or below caps 48. Upon receiving signals from sensor 264 the nano pillars 26 have closed to a second different degree (a second spacing distance), controller 268 may output control signals to fluid supply 40 such that fluid is maintained at a second level or height below tops 56 or below caps 48. In other words, rather than the maintenance of a selected fluid level or height being based upon time, the maintenance of the selected fluid level or height is based upon the detected degree of closure of nano pillars 26. In other implementations, closure sensor 264 may be omitted.

Figure 8:
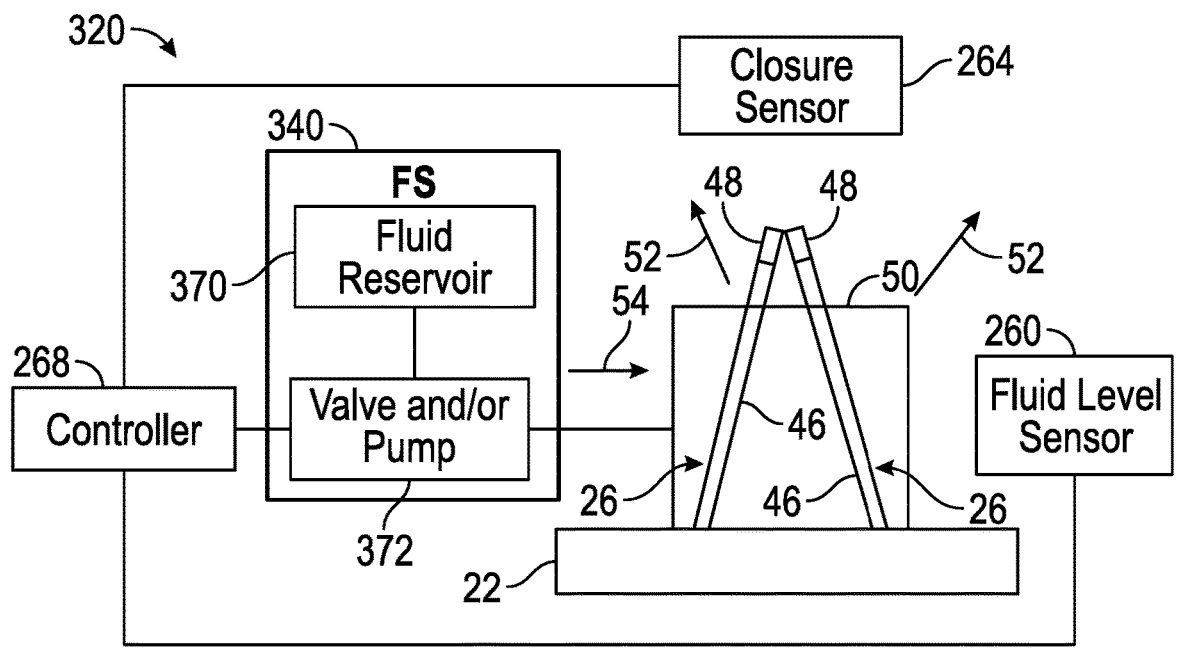
FIG. 8 is a schematic diagram illustrate portions of an example SEL nano pillar stage.

FIG. 8 schematically illustrates portions of an example SEL nano pillar stage 320. Stage 320 is similar to stage 220 described above except that stage 320 is specifically illustrated as comprising a fluid supply (FS) 340 which is specifically illustrated as comprising a fluid reservoir 370 and a valve and/or pump 372. Those remaining components of stage 320 that correspond to components of stage 220 are numbered similarly.

Fluid reservoir 370 comprise a chamber containing a supply of replenishing fluid for fluid 50. In one implementation, each of the components of fluid supply 320 are supported or embodied as part of a microfluidic die. In such an implementation, reservoir 370 may comprise a chamber formed within the microfluidic die. In other implementations, fluid reservoir 370 may be omitted, where fluid supply 340 comprise a port for connection to an external fluid reservoir.

Valve and/or pump 372 facilitates control over the replenishing of fluid, from fluid reservoir 370, to the fluid 50 about nano pillars 26. Valve and/or pump 372 operate in response to control signals from controller 268. In one implementation, valve and/or pump 372 comprises a valve which may be selectively opened and closed or which may have a variable degree of partial closing. In one implementation, the valve may comprise micro-electromechanical (MEM) valve mechanism.

In one implementation, valve and/or pump 372 may comprise a pump that may be in an on state, an off state, or that may have a variable rate of pumping. In one implementation, the pump may comprise a fluid actuator that displaces fluid in response to electrical signals. For example, the fluid actuator may include a piezoelectric membrane based actuator, a thermal resistor based actuator, an electrostatic membrane actuator, a mechanical/impact driven membrane actuator, a magneto-strictive drive actuator, or other such elements that may cause displacement of fluid responsive to electrical actuation.

Figure 9:
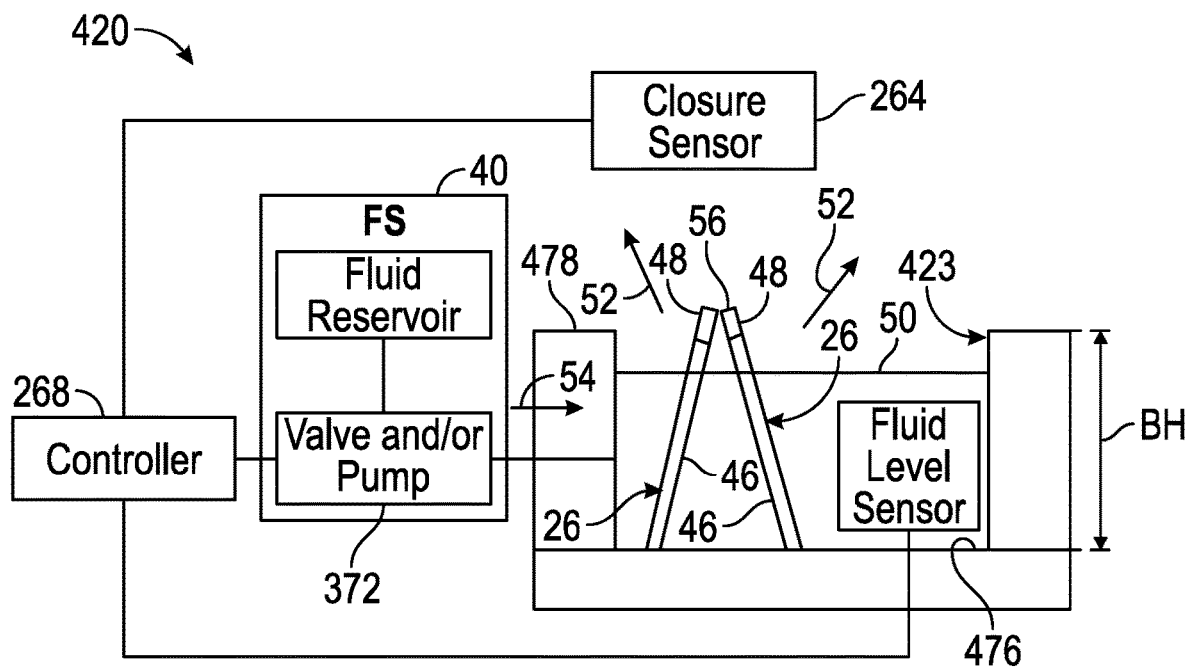
FIG. 9 is a schematic diagram illustrating portions of an example SEL nano pillar stage.

FIG. 9 schematically illustrates portions of an example SEL nano pillar stage 420. Stage 420 is similar to stage 320 described above except that stage 420 is specifically illustrated as containing fluid 50 about and amongst the array 24 of nano pillars 26 using a basin 423. Those remaining components of stage 420 which correspond to components of stage 320 are numbered similarly.

Basin 423 comprises a chamber comprising a floor 476 and at least one sidewall 478 which form an internal volume for containing fluid 50. In the example illustrated, the array 24 nano pillars 26 is located within basin 423, rising from floor 476 between sidewalls 478. In one implementation, basin 423 may be dimensioned so as to further facilitate control over the height of fluid 50 relative to nano pillars 26. For example, in one implementation, basin 423 may have a basin height BH that is equal to or less than the predetermined height at which fluid 50 is to be maintained by fluid supply 40 during closure of nano pillars 26. The basin height BH provides a limit to the height at which fluid 50 may rise. In such an implementation, the height of basin 423 may facilitate passive control over the replenishing of fluid by fluid supply 40. In such an implementation, fluid supply 40 may omit the controller 268 and the valve and/or pump 372. In other implementations, basin 423 may have a basin height BH that is greater than the height of nano pillars 26, facilitating full submersion of nano pillars 26 for the adsorption of analyte on caps 48 as described above.

FIGS. 10 and 11 schematically illustrate portions of an example SEL sensing stage 520. Stage 520 comprises an implementation of stage 420 described above. Those components of stage 520 which correspond to components of stage 420 are numbered similarly.

Stage 520 comprises substrate 522, basin 423, nano pillars 526, fluid supply 540, fluid level sensor 260, closure sensor 264 and controller 268. Substrate 52 is similar to substrate 22 described above except a substrate 522 is in the form of a microfluidic die that supports each of the remaining components of stage 520. In one implementation, substrate 522 may be formed from the same material as that of portions of nano pillars 526. In other implementations, substrate 522 maybe form from a different material than that of nano pillars 526. Examples of materials from which substrate 522 may be formed include, but are not limited to, photo resists, polymers, glass, ceramics and silicon.

Basin 423 is described above. Nano pillars 526 extend within basin 423. Nano pillars 526 are similar to nano pillars 26 except the nano pillars 526 are specifically arranged in pentamers, clusters of five closely grouped nano pillars. In other implementations, nano pillars 526 may have other cluster arrangements or groupings. As with nano pillars 26, nano pillars 526 each comprise a post 46 and a cap 48. The nano pillars 526 of each pentamer are bendable or closable towards one another in response to capillary forces.

Fluid supply 540 is similar to fluid supply 40 described above read fluid supply 540 comprises fluid reservoir 370, microfluidic passage 571 and valve and/or pump 372. Fluid reservoir 370 and valve and/or pump 372 are described above. Microfluidic passage 571 connects reservoir 370 to basin 423. In one implementation, microfluidic passage 531 comprises a groove formed within substrate 522.

Fluid level sensor 260 is described above. Fluid level sensor 260 is formed upon or carried by substrate 522 in close proximity with basin 423. Fluid level sensor 260 outputs signals indicating the level fluid within basin 423 to controller 268.

Closure sensor 264 is described above. Closure sensor 264 is formed upon a carried by substrate 522 in close proximity with basin 423. Closure sensor 264 output signals indicating the degree of closure of nano pillars 526. In some implementations, closure sensor 264 may be omitted. In some implementations, closure sensor 264 maybe supported independent of substrate 522, but may be in communication with controller 268.

Controller 268 is described above. Controller 268 outputs control signals based upon the sensed level fluid within basin 423 and/or the degree of closure of nano pillars 526 as detected by sensor 264, wherein the control signals control the replenishment of fluid to basin 423 by fluid supply 540. In one implementation, controller 268 may be selectively operated according to any of the replenishment protocols 120, 130, 140 described above.

In some implementations, stage 520 may be operated in a passive mode in which the replenishment of fluid to basin 423 is controlled or regulated using the height of basin 423 relative to nano pillars 526, the dimensioning of microfluidic passage 571 and/or the pressure of the fluid contained in reservoir 370. For example, as described above, basin 423 may have a basin height BH that is less or equal to the height at which fluid 50 is to be maintained relative to the tops 56 or the caps 48 of nano pillars 526. Microfluidic passage 571 may have an internal cross-sectional area and/or a length which, through capillary forces, controls the rate at which fluid is replenished to basin 423. Reservoir 370 may have a height or may contain fluid at a particular pressure so as to transmit fluid to basin 423 based upon the current level of fluid 50 within basin 423. In such a passive mode or implementation, sensor 260, sensor 264, pump/valve 372 and/or controller 268 may be omitted.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced luminescence nano pillar stage comprising:
    a substrate;
    an array of closable pillars extending from the substrate;
    a fluid supply connected to the array of pillars to at least partially replenish fluid amongst the pillars of the array that has evaporated to maintain a level of the fluid amongst the pillars of the array below tops of the pillars.

2. The nano pillar stage of claim 1 further comprising a basin formed in the substrate, wherein the array of pillars extends from the substrate within the basin.

3. The nano pillar stage of claim 2, wherein the basin has a height less than a height of the pillars.

4. The nano pillar stage of claim 3, wherein the fluid supply comprises a fluid reservoir and a microfluidic passage extending from the reservoir to the basin.

5. The nano pillar stage of claim 1, wherein the fluid supply comprises a fluid reservoir and wherein the stage further comprises a fluid pump to controllably supply fluid to the array of pillars fluid from the fluid reservoir.

6. The nano pillar stage of claim 1, wherein the fluid supply comprises a valve mechanism to control a supply of fluid from the fluid supply to the array of pillars.

7. The nano pillar stage of claim 1, wherein the pillars have plasmonic caps, wherein the fluid supply is to replenish fluid amongst the pillars of the array that has evaporated to maintain a level of the fluid amongst the pillars of the array below the caps of the pillars.

8. The nano pillar stage of claim 1 further comprising:
    a sensor to output signals indicating an extent of closure of the pillars; and
    a controller to adjust supply of fluid from the fluid supply based upon signals from the sensor.

9. The nano pillar stage of claim 1 further comprising:
a sensor to output signals indicating a level of fluid adjacent the nano fingers; and
a controller to adjust supply of fluid from the fluid supply based upon signals from the sensor.

10. A method comprising:
evaporating fluid amongst an array of closable pillars of a surface enhanced luminescence nano pillar stage; and
at least partially replenishing the fluid amongst the pillars of the array that has evaporated to maintain a level of the fluid amongst the pillars of the array below tops of the pillars.

11. The method of claim 10 further comprising:
sensing closing of the pillars; and
adjusting the replenishing of the fluid based upon the sensed closing of the pillars.

12. The method of claim 11, wherein the adjusting of the replenishing of the fluid comprises terminating replenishing of the fluid.

13. The method of claim 11, wherein the level of the fluid is maintained above a bottom of the pillars for at least two seconds.

14. The method of claim 10 further comprising:
sensing a level of fluid adjacent the pillars; and
adjusting the replenishing of the fluid based upon the sensed level of fluid adjacent the pillars.

15. A surface enhanced luminescence analyte nano pillar stage comprising:
a substrate;
a basin formed in the substrate;
an array of closable pillars extending from the substrate within the basin;
a fluid reservoir connected to the basin to contain a fluid to at least partially replenish fluid amongst the pillars of the array that has evaporated to maintain a level of the fluid amongst the pillars of the array below tops of the pillars.

* * * * *